US006785304B2

(12) United States Patent
Filgas

(10) Patent No.: US 6,785,304 B2
(45) Date of Patent: Aug. 31, 2004

(54) WAVEGUIDE DEVICE WITH MODE CONTROL AND PUMP LIGHT CONFINEMENT AND METHOD OF USING SAME

(75) Inventor: David M. Filgas, Newbury Park, CA (US)

(73) Assignee: GSI Lumonics, Inc., Kanata (CA)

(*) Notice: Subject to any disclaimer, the term of this patent is extended or adjusted under 35 U.S.C. 154(b) by 250 days.

(21) Appl. No.: 09/912,214

(22) Filed: Jul. 24, 2001

(65) Prior Publication Data

US 2003/0021324 A1 Jan. 30, 2003

(51) Int. Cl.$^7$ .............................................. H01S 3/098
(52) U.S. Cl. .......................... 372/19; 372/64; 372/66; 372/6; 372/102; 372/103
(58) Field of Search ..................................... 372/7, 34, 6

(56) References Cited

U.S. PATENT DOCUMENTS

| | | | | |
|---|---|---|---|---|
| 3,222,615 A | * | 12/1965 | Holly | 372/66 |
| 3,684,980 A | * | 8/1972 | Kay | 372/66 |
| 4,310,808 A | * | 1/1982 | Byer | 372/95 |
| 4,358,851 A | * | 11/1982 | Scifres et al. | 372/97 |
| 4,553,238 A | * | 11/1985 | Shaw et al. | 372/6 |
| 4,581,744 A | * | 4/1986 | Takamiya et al. | 372/92 |
| 4,637,025 A | * | 1/1987 | Snitzer et al. | 372/1 |
| 4,682,335 A | * | 7/1987 | Hughes | 372/6 |
| 4,787,086 A | * | 11/1988 | Dentai et al. | 372/19 |
| 4,815,079 A | * | 3/1989 | Snitzer et al. | 372/6 |
| 4,860,295 A | * | 8/1989 | Byer et al. | 372/19 |
| 4,876,215 A | * | 10/1989 | Hsu | 438/209 |
| 5,048,026 A | * | 9/1991 | Shaw et al. | 372/6 |
| 5,170,458 A | * | 12/1992 | Aoyagi et al. | 385/127 |
| 5,235,604 A | * | 8/1993 | Chinen | 372/6 |
| 5,237,630 A | * | 8/1993 | Hogg et al. | 385/12 |
| 5,327,444 A | * | 7/1994 | Mooradian | 372/44 |
| 5,349,600 A | * | 9/1994 | Shinbori et al. | 372/92 |
| 5,371,757 A | * | 12/1994 | Largent | 372/50 |
| 5,425,039 A | * | 6/1995 | Hsu et al. | 372/6 |
| 5,432,806 A | * | 7/1995 | Snitzer | 372/6 |
| 5,485,480 A | * | 1/1996 | Kleinerman | 372/6 |
| 5,504,762 A | * | 4/1996 | Hutchison | 372/29.011 |
| 5,533,163 A | * | 7/1996 | Muendel | 385/126 |
| 5,553,088 A | | 9/1996 | Brauch et al. | |
| 5,563,899 A | * | 10/1996 | Meissner et al. | 372/39 |
| 5,566,196 A | * | 10/1996 | Scifres | 372/6 |
| 5,574,740 A | * | 11/1996 | Hargis | 372/41 |
| 5,805,621 A | * | 9/1998 | Grubb et al. | 372/6 |
| 5,818,630 A | | 10/1998 | Fermann et al. | |
| 5,852,622 A | * | 12/1998 | Meissner et al. | 372/39 |
| 5,949,941 A | * | 9/1999 | DiGiovanni | 385/127 |
| 5,974,061 A | * | 10/1999 | Byren | 372/34 |
| 6,031,849 A | * | 2/2000 | Ball et al. | 372/6 |
| 6,160,824 A | * | 12/2000 | Meissner et al. | 372/7 |
| 6,263,002 B1 | * | 7/2001 | Hsu et al. | 372/6 |
| 6,288,835 B1 | * | 9/2001 | Nilsson et al. | 359/341.3 |
| 6,298,187 B1 | * | 10/2001 | Waarts et al. | 385/37 |
| 6,373,863 B1 | * | 4/2002 | Ohishi et al. | 372/6 |
| 6,411,762 B1 | * | 6/2002 | Anthon et al. | 385/123 |
| 6,477,295 B1 | * | 11/2002 | Lang et al. | 385/31 |
| 6,560,392 B2 | * | 5/2003 | Sugimoto et al. | 385/123 |
| 2002/0018630 A1 | * | 2/2002 | Richardson et al. | 385/127 |
| 2002/0076156 A1 | * | 6/2002 | Kringlebotn et al. | 385/37 |

* cited by examiner

Primary Examiner—Leon Scott, Jr.
(74) Attorney, Agent, or Firm—Brooks Kushman, P.C.

(57) ABSTRACT

A waveguide device in the form of either a solid-state laser or amplifier is divided into separate pumping and output mode control sections along at least one direction of the device by leaving a portion of a core of the device unclad or by depositing appropriate coatings on different sections of the core or by contacting/bonding materials with different refractive indices to different sections of the core or by a combination of these approaches. The core has a pump input surface for receiving pumping radiation at a pumping wavelength and one or more output surfaces for emitting a laser beam at an output wavelength. When used as an amplifier, the core also has a laser input surface which may be the same as one of the output surfaces.

30 Claims, 9 Drawing Sheets

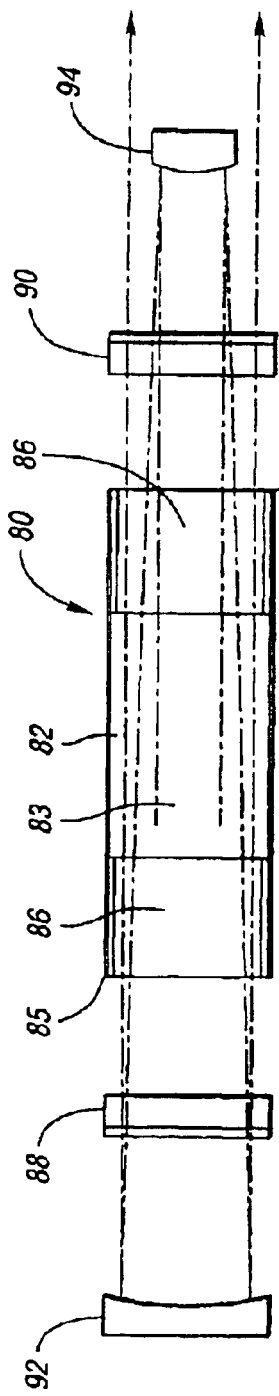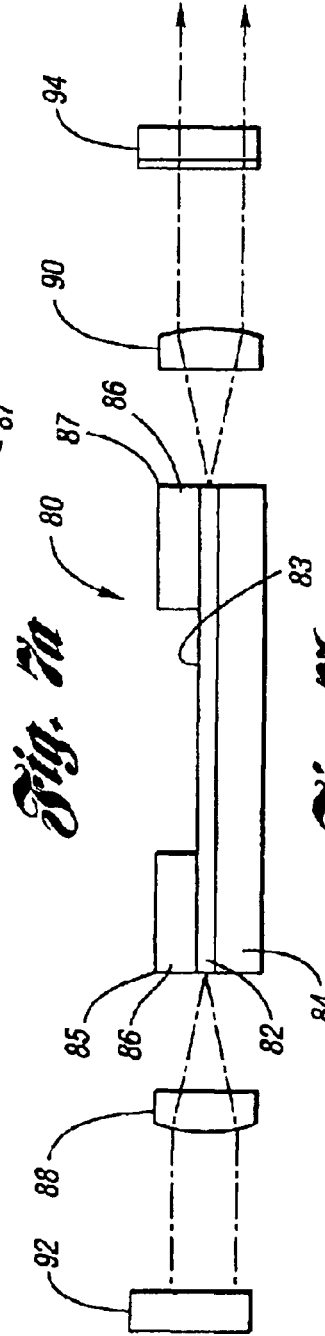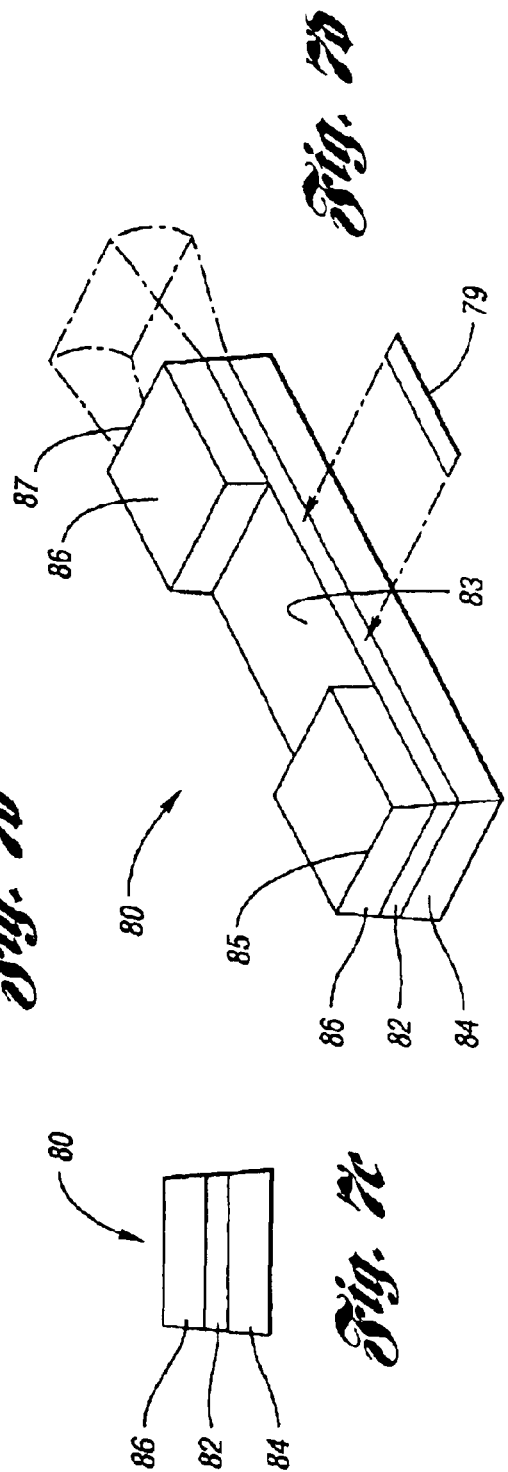

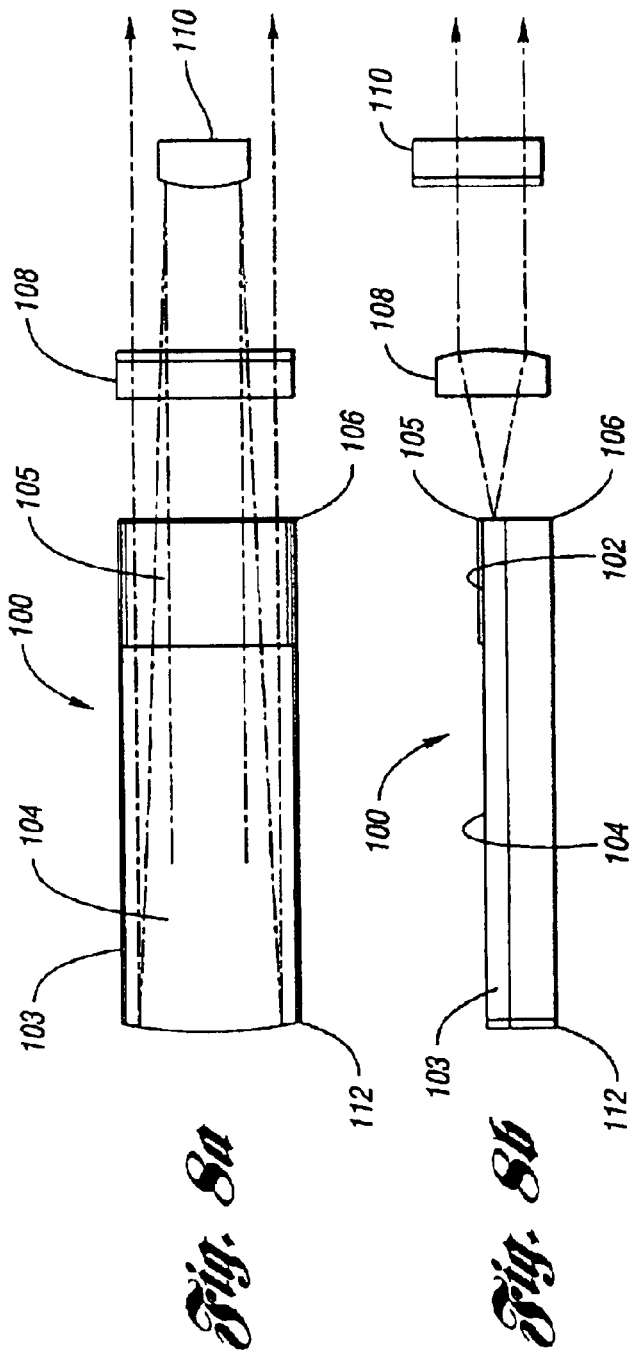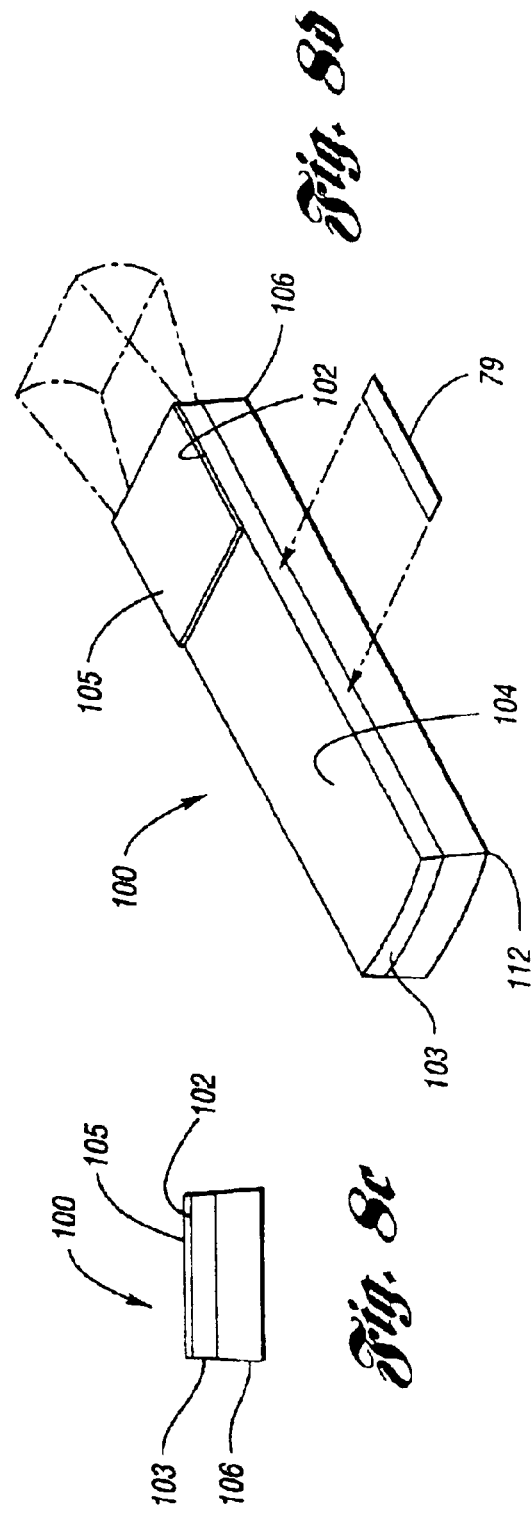

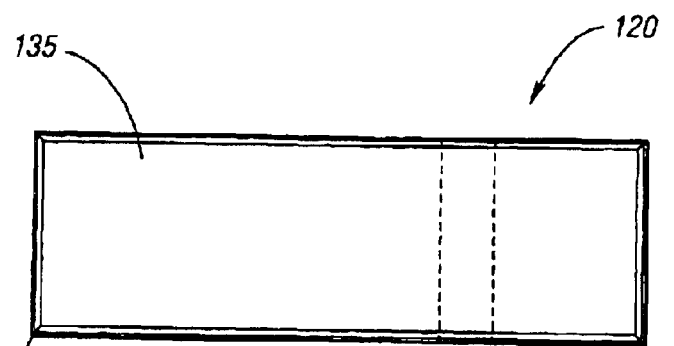
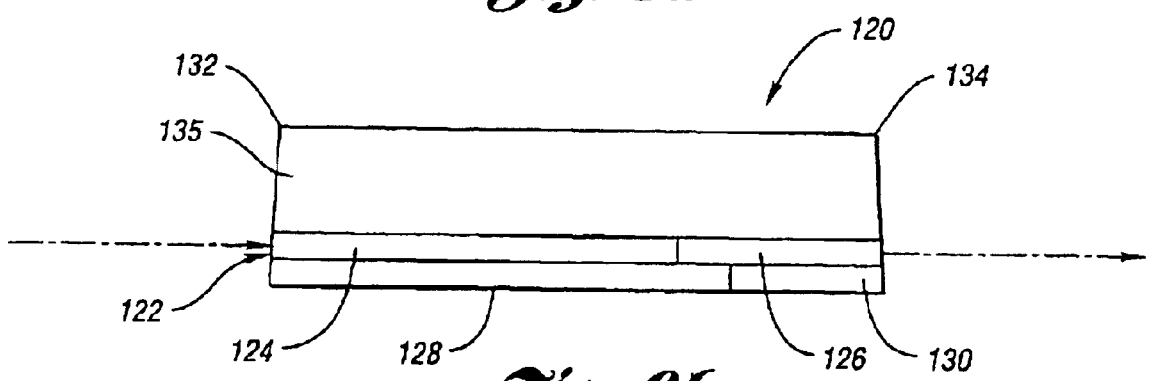
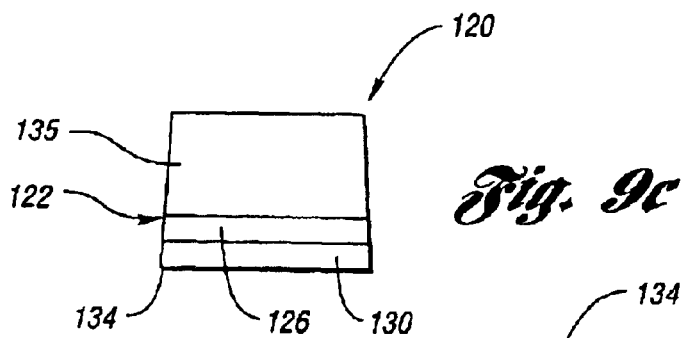
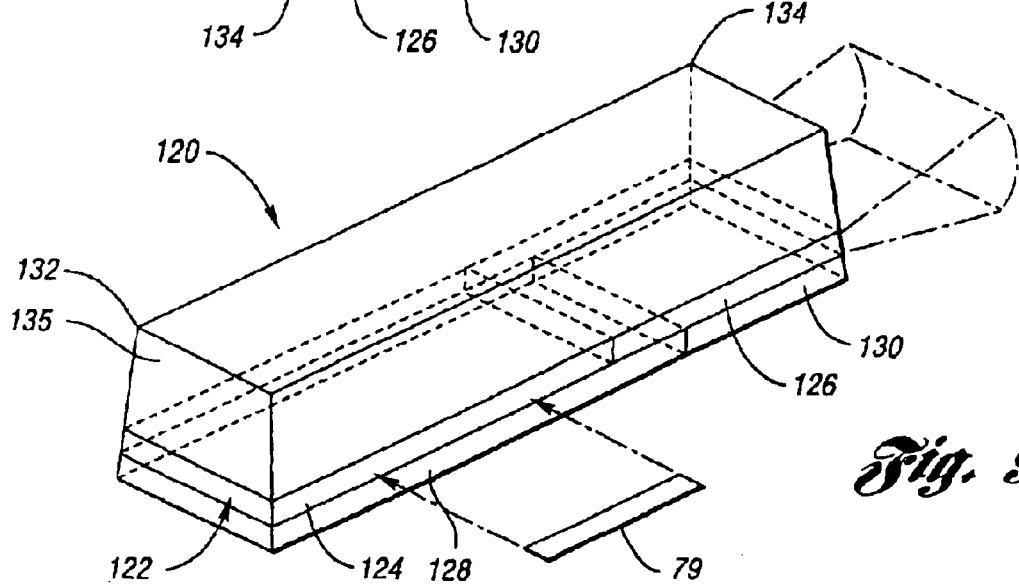

WAVEGUIDE DEVICE WITH MODE CONTROL AND PUMP LIGHT CONFINEMENT AND METHOD OF USING SAME

BACKGROUND OF THE INVENTION

1. Field of the Invention

The present invention relates to pumped solid-state lasers, amplifiers and methods for using same and, particularly, when such pumping is provided by one or more laser diodes. The invention can be used in high power diode pumped lasers for applications such as materials processing. The invention can also be used in low power diode pumped lasers for applications such as marking, cutting, drilling, machining, and communications. The invention can also be used in amplifiers for amplifying laser beams. The invention offers particular advantages for amplifying pulsed laser beams such as those produced by q-switched and/or mode locked lasers.

2. Background Art

Most solid state laser applications benefit from the use of laser sources which have high beam quality, high efficiency, and high reliability, and which are low in cost. When compared to lamp-pumped, solid state lasers, LPL's, diode-pumped, solid state lasers, DPL's, offer significant advantages in terms of beam quality, efficiency, and reliability, but their cost effectiveness is hampered by the high cost of laser diodes.

Typically, the pump diodes are the single most expensive component in a diode-pumped solid-state laser. The diode cost may be minimized by utilizing a DPL design with a high optical-to-optical conversion efficiency (the percentage of output power from the pump diodes which is converted to useful output from the DPL). For a higher optical-to-optical efficiency, a lower diode pump power is required to achieve a given output power. High optical-to-optical efficiency also benefits the overall system efficiency and helps improve system reliability. Using diodes without beam conditioning optics (microlenses or fiber coupling) also helps reduce the cost of the pump diodes. Diodes with integrated microlenses or fiber coupling are significantly more expensive and are lower in efficiency because 10% to 20% of the diode output is normally lost in the beam conditioning optics. Additionally, utilizing diodes with simple packages can minimize the cost of the pump diodes. Typically, if the diodes must be packed very close together, expensive microchannel heatsinks must be used. DPL designs that use diode bars individually mounted or stacked with a wide bar-to-bar spacing may benefit from the ability to use lower cost diode packages. In order to minimize the cost of the pump diodes, the ideal DPL design should have a high optical-to-optical conversion efficiency, should not require beam conditioning optics for the pump diodes, and should permit the use of diodes with simple packaging.

A variety of laser crystals and glasses may be used as the gain medium for DPL's. The most commonly used crystal for high power DPL's is Neodymium doped Yttrium Aluminum Garnet, Nd:YAG. YAG is a synthetic crystal with good thermal, mechanical, and optical properties. When doped with about 1% atomic Nd, it exhibits a number of strong four-level lasing transitions. The strongest line is at 1064 nm. Commercially available laser diodes at 808 nm and 880 nm are typically used to pump Nd:YAG.

For most types of lasers, and, in particular, for solid-state lasers, thermal effects in the gain medium hamper achieving high beam quality during high output power operation. In solid-state lasers, the gain medium is normally pumped throughout its volume and cooled on one or more surfaces. This volume heating and surface cooling leads to thermal gradients in the gain medium. These thermal gradients cause stress gradients in the gain medium because thermal expansion in the hotter part of the gain medium is constrained by the cooler part of the gain medium. Because the refractive index of the gain medium is dependent on both temperature and stress, the thermal and stress gradients in the gain medium create refractive index gradients. Light traveling in the gain medium perpendicular to these gradients will experience focusing effects because the refractive index gradient makes the gain medium act as a gradient index lens. Achieving high output power and high beam quality simultaneously requires taking some steps to minimize the impact of these effects on the laser performance.

Many different DPL designs have been developed in the effort to achieve high power, high beam quality, high efficiency, high reliability, and low cost. The most common configuration is the rod-geometry DPL. In a rod-geometry DPL, the gain medium is shaped as a cylinder. It is pumped either through its side surface or through its end surface(s) and is cooled on its side surface. The beam propagates along the axis of the rod.

In rod-geometry solid-state lasers the thermal gradients are radial and light traveling down the length of the rod is focused. The strength of this "thermal lensing" is directly proportional to the pumping power. This thermal lensing limits the beam quality of high power, rod-geometry solid-state lasers making them a poor choice for high power, high beam quality applications. Rod-geometry DPL's are relatively simple to build, can be designed using diodes without beam conditioning optics and have reasonable efficiencies. Rod-geometry DPL's are currently available at kilowatt average power levels. An exemplary rod-geometry DPL is generally indicated at 10 in FIG. 1. The DPL 10 includes a laser diode stack 12 and lenses 14 which focus pump beams 16 through apertures formed in a tube 17. The focused light travels through cooling water in a flow tube 18 and into a YAG rod 20.

Numerous alternative solid-state laser geometries have been developed which use gain media with different shapes, beam paths, pumping arrangements, and cooling techniques in order to achieve high power operation at a high beam quality level. These designs include zigzag slab lasers, thin disk lasers, and planar waveguide lasers. Each of these designs utilizes cooling of a flat surface on the gain medium to produce a thermal gradient that is one-dimensional.

Zigzag slab lasers use a gain medium that is rectangular in cross section transverse to the beam propagation direction. The longer of the two opposing surfaces of the rectangle is cooled while the adjacent faces are uncooled. This establishes a one dimension thermal gradient perpendicular to the two cooled faces. Pumping can be either through the cooled faces or the uncooled faces. The beam path through the active medium follows a zigzag path making multiple reflections off the two cooled faces. The zigzag path has the effect of averaging the thermal gradient seen by any part of the laser beam such that thermal lensing is eliminated to first order. Second order effects still tend to hamper the beam quality at high power. The beam quality is typically different in the zigzag direction and the transverse direction. DPL's of this type typically require pump laser diodes 44 to be packed close together in order to minimize the required length of the gain medium. The precision required in the fabrication of the slab itself makes it significantly more expensive than a rod of comparable length. Several companies offer high power zigzag slab DPL's with power levels as high as 3 kW. TEMoo output powers from zigzag slab DPL's have been limited to about 100W. A diagram of this design is shown in FIG. 2 wherein cooling water is indicated at 22.

Thin disk lasers use a disk-shaped piece of laser crystal that has a diameter much larger than its thickness. It is cooled on one of its large flat surfaces. The cooled surface acts as a mirror in the beam path of the laser and the beam is amplified as it passes through the disk before and after reflection from the mirrored surface. Because the beam is traveling in the same direction as the thermal gradient in the laser crystal there is, in principle, no thermal lensing. Again, second order thermal effects are the ultimate limitation to beam quality at high power.

This type of laser was originally developed for fusion research using lamp pumping of one of the large faces. More recently, a version of this laser was developed and patented by researchers in Germany (U.S. Pat. No. 5,553,088, Brauch, et al.). This version is based on mounting one of the faces of the disk to a solid heatsink and using diodes to pump the disk from the opposite face or from the edges. This design has shown TEMoo beam qualities up to 100W and has been scaled to powers as high as 650W with beam quality <10 times diffraction limited (about 5–7 times higher beam quality than current lamp pumped 1 kW rod geometry lasers and about 3 times higher beam quality than a typical 1 kW diode pumped rod geometry laser). An exemplary thin disk laser is generally indicated at 24 in FIG. 3. A fiber bundle 26 is located adjacent a crystal and heatsink 28 which, in turn, is located adjacent a flat mirror 30. A planar array of spherical imaging mirrors 32 image the light from the crystal. An output coupler 34 is also provided.

Recently, the planar waveguide laser geometry has emerged as another alternative geometry for diode-pumped, solid-state lasers. Planar waveguide lasers, such as the one generally indicated at 36 in FIG. 4, have many attributes not generally found in any other diode-pumped, solid-state lasers. In a planar waveguide DPL the gain medium is a sheet 38 a few microns to a few hundred microns thick which acts as the core of a one-dimensional waveguide. This core 38 is typically attached to a substrate 40 that serves as a cladding on one side of the core 38. If the opposite side of the core 38 is clad with the same material as the substrate, the waveguide is referred to as a symmetrical waveguide. If the opposite side of the core 38 is unclad or clad with a material different from that of the substrate, the waveguide is referred to as an asymmetrical waveguide. FIG. 4 shows a cladding 42 on top of the core 38. In some cases there may be multiple claddings on one or both sides of the core 38. The refractive index of the core 38 is higher than that of the claddings. In the guided direction, this refractive index difference defines an acceptance angle or Numerical Aperture (NA) 46 into which light will be guided through the core 38 with low loss via total internal reflections at the core/clad interface. The NA of the waveguide is defined by the equation $NA=\sin(\Theta/2)$ where $\Theta$ is the full acceptance angle. For a symmetric waveguide, the NA may be calculated based on the refractive indices of the core and cladding according to the equation $NA=\sqrt{n_0^2-n_1^2}$ where $n_0$ is the refractive index of the core 38 and $n_1$, is the refractive index of the cladding. In the transverse, unguided, direction the light propagates as it would through a bulk section of the gain medium.

Planar waveguides may be side pumped, end pumped or face pumped by introducing the pump light into the sides, ends, or faces of the core, respectively. Side pumping and end pumping offer very high efficiency if the pump light is coupled into the core within the NA of the waveguide and if the width and length are long enough to provide significant absorption of the pump light. Face pumping is typically less efficient because the core is too thin to provide significant absorption of the pump light on a single pass. In this case the waveguide is typically surrounded by a reflective cavity which will redirect the transmitted pump light back into the core multiple times. Losses in the reflective cavity contribute to reduced efficiency when face pumping.

The side-pumped geometry for planar waveguide lasers lends itself to butt-coupling of the diode laser light into the core layer without the need for any radiance conditioning optics. As a result of butt-coupling, the planar waveguide laser system can be very compact, rugged, portable, simple to operate, and inexpensive. As the output power of 10 mm long laser diode bars continues to increase from 20 W to 40 W and beyond, higher laser output will become available from the same compact waveguide package due to the aggressive thermal engineering that is intrinsic to the approach.

Planar waveguides are typically face cooled by attaching a heatsink to the outer face of the substrate and/or cladding. Face cooling causes the heat to flow perpendicular to the plane of the core resulting in an essentially one-dimensional thermal gradient in the core. Thermal effects during laser operation are minimized because the lasing region is about 2 orders of magnitude thinner than that used in rod or slab lasers. Temperature differences between the center of the guide and the edge are on the order of 0.1° C., and can be neglected. The minimal temperature gradient in the guided direction, combined with the guiding effect of the waveguide structure eliminate any thermally induced optical effects like the thermal tensing seen in rod geometry lasers. The thermal gradient within the core in the transverse direction is also minimal and compatible with high beam quality operation.

As a consequence of the essential absence of thermal effects in planar waveguide lasers, the beam quality can be close to diffraction limited ($M^2<1.2$) and the beam quality is not significantly affected by changes in pumping power. Additionally, scaling from low average power to powers of 10s or even 100s of watts does not require corrections in the laser architecture to counteract the increased waste heat generation as would be expected for rods or slabs. The length of the pumped region can readily be increased from around 1 cm for 10 W class lasers to several cm for power scaling. This relatively short length is in contrast to fiber lasers that employ fiber lengths on the order of several meters to 10s of meters. Although fiber lasers have demonstrated good power scalability, they run into limitations due to Raman scattering or other nonlinear interactions between the developed laser radiation and the laser gain medium if short pulses are desired. Planar waveguide lasers have no such limitations due to their very short gain medium lengths. Additionally, because cavity lengths on the order of a few cm characterize the laser resonators for waveguide lasers, nanosecond and sub-nanosecond q-switched output pulses can be readily generated.

Planar waveguides can be designed to produce single mode beam quality in the guided direction if the thickness of the core is below the cutoff thickness for propagation of the next higher order mode. This cutoff thickness is related to the NA of the waveguide. For typical NA's, the maximum core thickness for single mode operation can range from a few microns to a few tens of microns. For a larger core thickness, the beam quality will be multimode in the guided direction unless some additional mode control technique is used.

In the transverse direction, the beam quality of a planar waveguide laser is determined by the type of resonator used. The resonator can be either stable or unstable. The resonator mirrors can be fabricated directly on the ends of the waveguide or they can be external optics. An unstable resonator fabricated directly on the ends of the waveguide offers high beam quality operation from a simple, robust, monolithic device. By incorporating appropriate devices or features into the resonator, planar waveguide lasers may be polarized, q-switched, mode-locked, or frequency shifted.

The core in a planar waveguide has the same laser characteristics as the bulk medium used. High gains can be generated in planar waveguides because pump light is confined to a small guiding region. This high pumping density in planar waveguides offers features that are not matched by other solid-state laser architectures. Besides being operational for the three common $Nd^{3+}$ lasing transitions, planar waveguides are ideally suited for efficient and power-scalable operation of quasi-3-level lasing ions, such as $Yb^{3+}$, $Tm^{3+}$, and $Er^{3+}$. Losses are typically less than 0.2 dB/cm and can potentially be reduced farther through improvements in the fabrication process. The low loss combined with the high gain in a planar waveguide permit the operation of additional laser transitions having a low gain, as is the case for tunable lasers based on $Cr^{3+}$ in a number of lasing media.

Data regarding diode pumped planar waveguide lasers has been published by ORC Southampton, Heriot Watt University, and Maxios Laser Corporation among others. Maxios has obtained a patent which describes its planar waveguide laser design, U.S. Pat. No. 6,160,824, which is incorporated here in its entirety.

The Maxios laser, generally indicated at 48 in FIG. 5, uses a double-clad structure as shown to contain the pump light and to provide high beam quality output and also utilizes stress-induced birefringence to control the polarization. The NA of the interface between a core 50 and an inner clad 52 is low, about 0.02, to provide mode control but the NA of the interface between the inner clad 52 and an outer clad 54 is high, about 0.5, to provide pump confinement. The Maxios design achieves high beam quality and is reasonably simple and efficient. The structure used by Maxios is fabricated by diffusion bonding bulk material and polishing it down to the required thickness. The biggest drawback this type of double-clad design is that the waveguide 48 is a five-layer structure with three layers 50 and 52 that are very thin, 5–50 microns thick. The complex structure makes fabrication difficult. An additional drawback is that the absorption rate of the pump light from a pump diode 56 in the core 50 is reduced by a factor equal to the ratio of the core thickness to the total thickness of the core 50 and inner cladding layers 52. This is because the pump light fills both the core 50 and the inner cladding layers 52 but there is no absorption of the pump light while it is bounding through the inner cladding layers 52. A wider waveguide must be used to compensate for the lower absorption rate. To minimize the absorption rate reduction caused by the inner clad layers 52, the inner clad layers 52 are kept extremely thin (less than½ the thickness of the core 50), contributing to the fabrication difficulties.

The U.S. patent to Fermann et al., U.S. Pat. No. 5,818,630, discloses single-mode amplifiers and compressors based on multi-mode fibers. Multi-mode fibers amplify laser light in a single-mode amplifier system.

SUMMARY OF THE INVENTION

An object of the present invention is to provide an improved waveguide device with mode control and pump light confinement and method of using same.

Another object of the present invention is to provide a waveguide device with mode control and pump light confinement and method of using same wherein the device can deliver desired power, beam quality, efficiency, and reliability while utilizing a minimum amount of pump power such as diode pump power.

In carrying out the above objects and other objects of the present invention, a waveguide device which acts as a waveguide in at least one direction thereof is provided. The device includes a core having a pump input surface for receiving pumping radiation at a pumping wavelength and at least one output surface for emitting a laser beam at an output wavelength, and means for providing pump-light confinement and means for providing output mode control in different sections of the device along the direction of beam propagation.

The guided direction is preferably not the same as the direction of beam propagation. The direction of beam propagation, also called the optical axis, runs along the length of the waveguide. The guided direction in the planar waveguides is perpendicular to the plane of the core.

The core may be a single member and may include an active core member and a passive core member.

The means for providing pump-light confinement may include a pump-light containment component which may be in contact with a surface of the core in a pumping section of the device, and wherein the pump-light containment component may be a pump cladding.

The means for providing output mode control may include a coating in contact with the core, a mode control cladding in contact with the core, or a grating in contact with the core.

The core may be a planar core or may be a cylindrical core.

The device may further include a substrate for supporting the core.

The device may be a laser and wherein the laser may be a planar waveguide laser.

The core may have a laser input surface for receiving a source laser beam to be amplified and wherein the device is a optical amplifier.

The core may be planar and wherein the optical amplifier is a planar waveguide amplifier.

The laser input surface may be different from either the pumping input surface or the at least one output surface.

The laser input surface may be the same as the at least one output surface.

An output mode control section of the device may have a lower NA than the pumping section of the device.

The pumping section may have a NA greater than 0.05.

The output mode control section may have a NA less than 0.22.

The planar core may include doped YAG.

The pump cladding may have a lower refractive index than the refractive index of the core.

The pump cladding may be sapphire or undoped YAG.

The mode control cladding may include a material having a refractive index between that of the core and that of the pump cladding.

The mode control cladding may include doped or undoped YAG.

The planar core may include a first core member which absorbs the pumping radiation and a separate second core member which either does not absorb the pumping radiation or has an absorption lower than absorption of the first core member at the pumping wavelength.

The device may act as a pair of separate waveguides which are butt-coupled or coupled together by an imaging system.

The device may be an optical fiber.

The means for providing output mode control may include a mode control cladding different from the pump cladding.

The device may comprise sections of different types of fiber which are either spliced, butt-coupled or coupled together by imaging an output from one section into the other section.

In carrying out the above objects and other objects of the present invention, a method for generating a laser beam having a desired output mode is provided. The method includes providing a core having a pump input surface and at least one output surface. The core serves as a waveguide in at least one direction. The core is pumped at the pump input surface with pumping radiation at a pumping wavelength so that an output laser beam is emitted at the at least one output surface at an output wavelength. The method includes the step of separating the functions of pump-light confinement and output mode control to different sections along the length of the waveguide.

The core may have a laser input surface and wherein the method further comprises transmitting a source laser beam into the core at the laser input surface wherein the source laser beam is amplified within the core and wherein the output beam is an amplified source laser beam.

The invention provides a structure for the gain medium in a diode-pumped solid-state laser or amplifier in which the gain medium acts as a waveguide in at least one direction and in which there are separate sections along the length of the waveguide for pump light confinement and output mode control. When implemented as a side-pumped planar waveguide laser, this invention offers many advantageous features including simple power scaling, high beam quality at high power levels, high efficiency and high reliability. Compared to most other solid-state laser designs with high beam quality, the invention requires less diode pump power to achieve a desired output power and in most cases the pump diodes do not require beam-conditioning optics.

When implemented as an amplifier, the proposed invention offers higher gain than bulk rod, slab, or disk amplifiers for a given pump power due to the reduced cross-sectional area of the core. The invention also offers reduced ASE compared to a bulk rod, slab, or disk amplifier of equivalent gain. The invention also permits higher pulse energies without damage than fiber amplifiers due to the larger cross-sectional area of the core.

The emitters on high power laser diodes have typical dimensions of 50 microns to 500 microns in the "slow axis" and about 1 micron in the "fast axis." The beam divergence is about 10° FWHM in the slow axis. In the fast axis, the light emitted by diode lasers is highly divergent with a numerical aperture, NA, of about 0.5 (NA=sin($\Theta$/2) where $\Theta$ is the full angle beam divergence). If laser diodes are butt-coupled to the side of the core in a planar waveguide structure with their fast axis in the guided direction, a waveguide NA>0.5 is required to confine the pump light to the core. Ideally, however, the laser output from the waveguide should have a much lower NA in order to produce a good beam quality output mode from a waveguide core of a reasonable thickness. For example, a waveguide with a NA of 0.5 would require an extremely thin core thickness of about 1 micron in order to guarantee single mode output, but a waveguide with a NA of 0.02 could produce single mode output from a core thickness in the range of 20 to 50 microns. In order to minimize alignment tolerances when butt-coupling the pump diodes, it is desirable to have a waveguide core much thicker than the typical 1 micron emitter height of the pump diodes. A thicker core also simplifies fabrication. The desire to have a thick core with a high NA for efficient pump light capture and a lower NA for output mode control is addressed by this invention.

The proposed invention separates the functions of pump light containment and output mode control by moving them to different sections along the length of the waveguide. Mode control does not need to occur over the entire length of the waveguide in order to get a low NA output beam. Likewise, there is no need to pump the entire length of the waveguide. It is therefore sensible to optimize a portion of the length of the waveguide to have the desired mode control properties (a low NA) and to optimize another section of the waveguide to have maximum pump light containment (a high NA).

This can be achieved by leaving a portion of the waveguide core unclad or by depositing appropriate coatings on different sections of the core or by contacting/bonding materials with different refractive indices to different sections of the core or by a combination of these approaches. There may be other techniques as well, possibly applying a grating to a portion of the length of the waveguide for mode control.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIGS. 7a–7d are top, side, end, and perspective schematic views, respectively, of a second embodiment of the present invention implemented as a side-pumped, planar waveguide laser utilizing an unclad pumping section and external resonator mirrors;

FIGS. 8a–8d are top, side, end, and perspective schematic views, respectively, of a third embodiment of the present invention implemented as a side pumped, planar waveguide laser wherein a coating is used to provide a low NA, mode control section and an external resonator mirror is used on one end of the waveguide device while an integral resonator mirror is used on the other end of the waveguide device;

FIGS. 9a–9d are top, side, end, and perspective schematic views, respectively, of a fourth embodiment of the present invention implemented as a side-pumped, planar waveguide amplifier wherein the core is a compound structure and the ends of the waveguide device are polished flat, canted, and AR coated;

FIGS. 10a–10d are top, side, end, and perspective schematic views, respectively, of a fifth embodiment of the present invention implemented as a side-pumped, planar waveguide amplifier wherein a pumping section and a mode control section of the device comprise discrete waveguides;

FIGS. 11a–11d are top, side, end, and perspective schematic views, respectively, of a sixth embodiment of the present invention implemented as a double-pass, planar waveguide amplifier wherein the waveguide device is end-pumped; and FIGS. 12a–12d are top, side sectional, end, and perspective schematic views, respectively, of a seventh embodiment of the present invention wherein the waveguide device is a fiber.

BEST MODE FOR CARRYING OUT THE INVENTION

Figure 1:
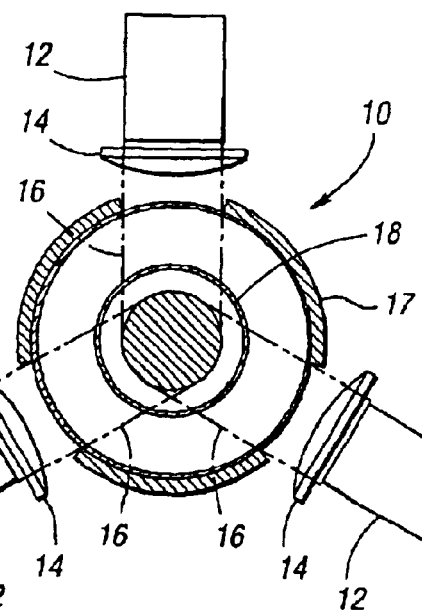
FIG. 1 is a schematic end view of an exemplary, prior art, diode-pumped, rod-geometry laser.
Figure 2:
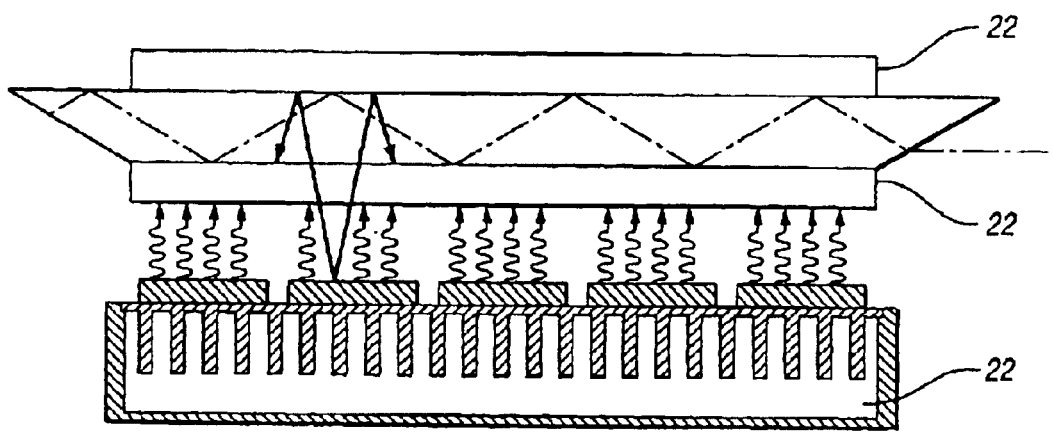
FIG. 2 is a schematic side view of a high power, diode-pumped, zigzag slab laser of the prior art.
Figure 3:
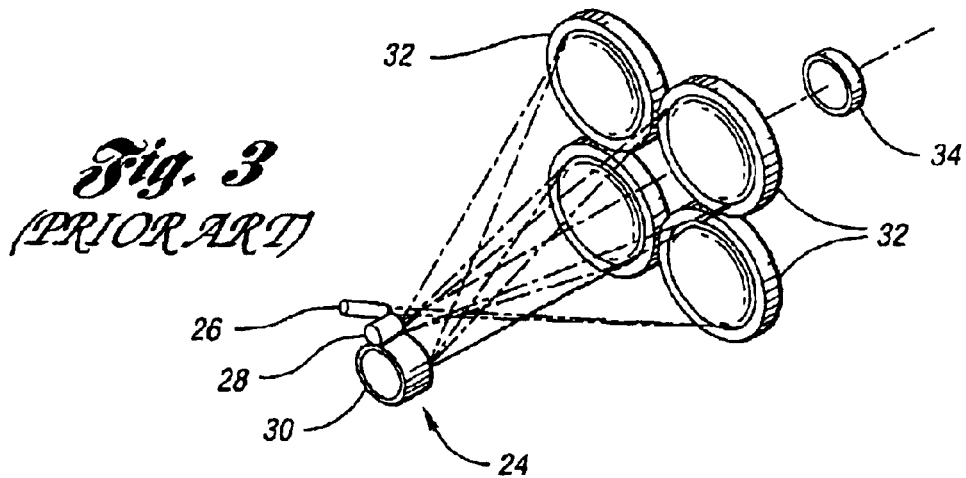
FIG. 3 is a schematic perspective view of a prior art, diode-pumped, thin disk laser including a number of spherical mirrors for re-imaging the pump light onto a thin disk.

A preferred embodiment of a waveguide device of the present invention, as applied to a diode pumped planar waveguide laser, is generally indicated at 60 in FIGS. 6a–6d.

The laser 60 includes a waveguide core 62 of 1.0% doped Nd:YAG which may be 5–200 microns thick, 0.5–10 mm wide, and 10–150 mm long. For one specific case, the actual core dimensions are 30 microns thick×5.5 mm wide×30 mm long. The laser 60 also includes a sapphire cladding/structural member 64 that is 0.5–10 mm thick with a length and width equal to that of the core 62 and is optically contacted and diffusion bonded to the core 62 via their large faces 61 and 63, respectively. For the specific case mentioned above, the actual thickness of the structural member 64 is 3 mm.

The laser 60 further includes a sapphire pump guide cladding component 66 which is 0.1–1 mm thick, with a width equivalent to that of the core 62, and a length 50% to 90% as long as that of the core 62 optically contacted and diffusion bonded to an exposed large face 65 of the core 62 via one of its large faces 67 so that its end 68 is flush with one end 69 of the waveguide core 62. For the specific case mentioned above, the actual thickness and length of the sapphire pump guide cladding component 66 are 0.5 mm and 24 mm, respectively.

The laser 60 still further includes a 0.8% doped Nd:YAG mode control cladding component 70 which has a thickness equivalent to that of the pump guide cladding component 66, a width equivalent to that of the core 62, and a length equal to the length of the core 62 minus the length of the pump guide cladding 66, is optically contacted and diffusion bonded to the remaining portion of the exposed face 65 of the core 62 via one of its large faces 71 so that its end 72 is flush with the opposite end 73 of the waveguide core 62.

End faces 74, 75 and 76 of the waveguide structure, those faces perpendicular to its length, are polished to form a hybrid stable/unstable resonator. The resonator is stable in the guided direction but unstable in the transverse direction. The unstable resonator is a confocal design (the sum of the end face radii is equal to twice the length of the resonator).

Figure 6A:
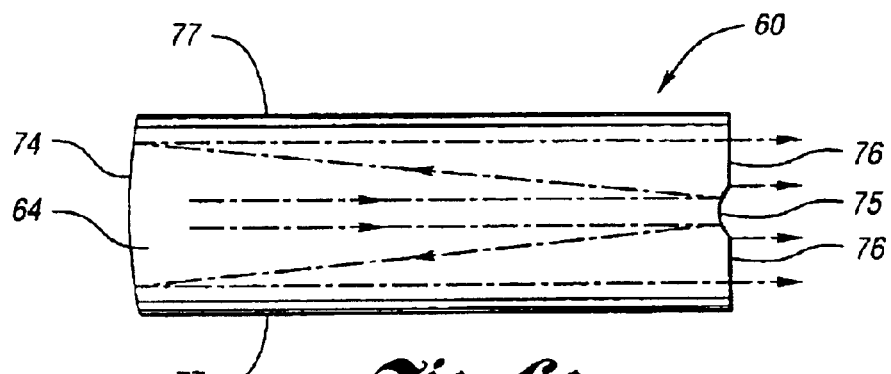
FIGS. 6a–6d are top, side, end, and perspective schematic views, respectively, of a first embodiment of the present invention implemented as a side-pumped, planar waveguide laser.
Figure 6B:
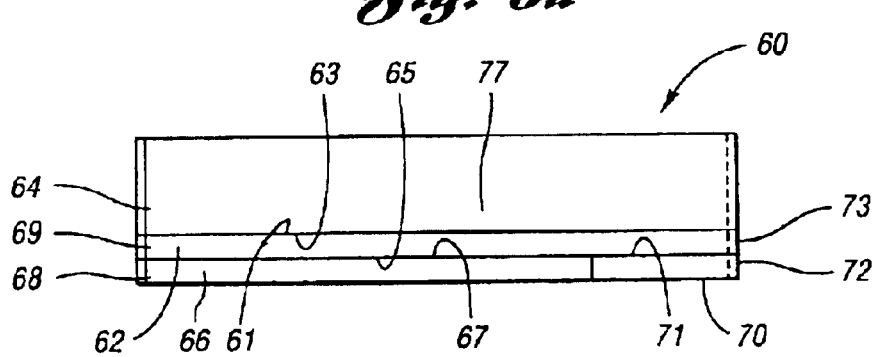
Figure 6C:
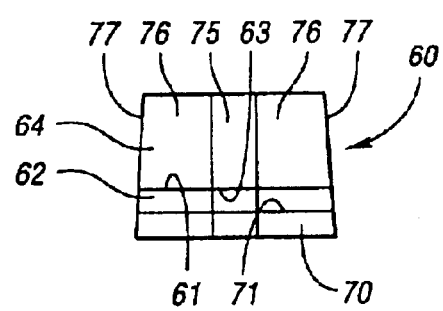
Figure 6D:
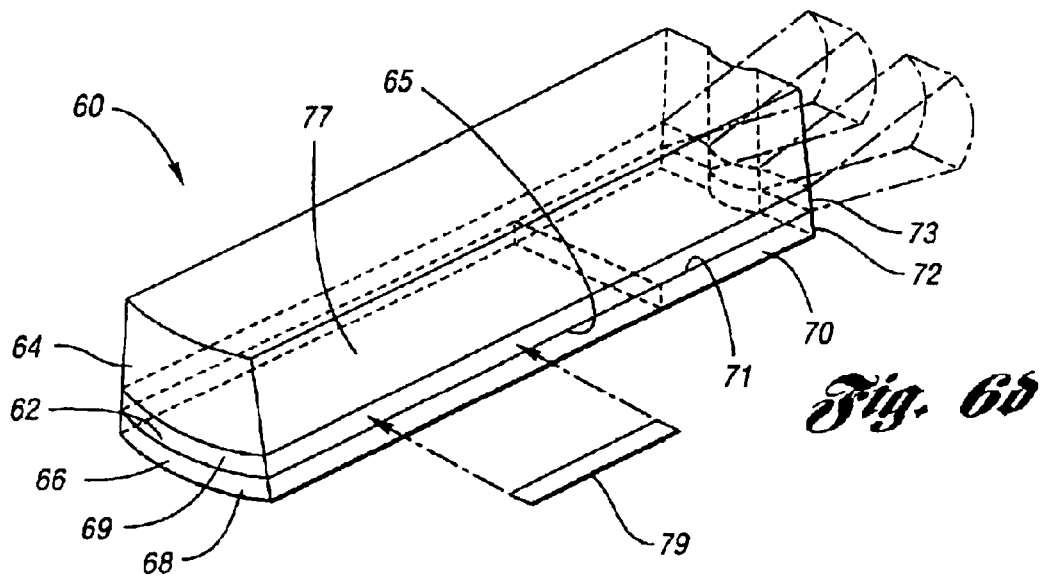
Figure 10A:
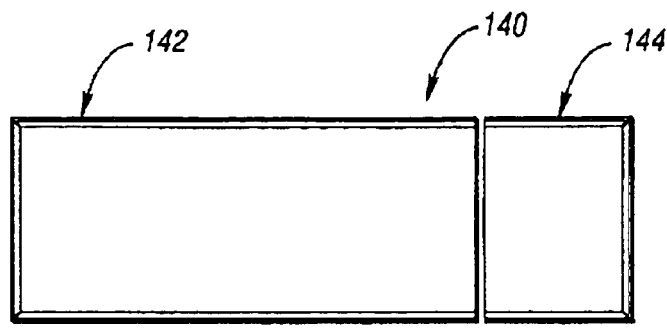
Figure 10B:
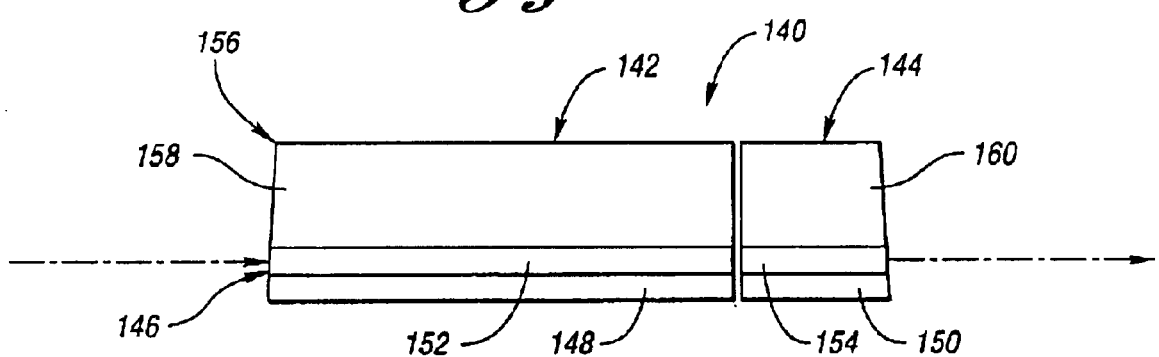
Figure 10C:
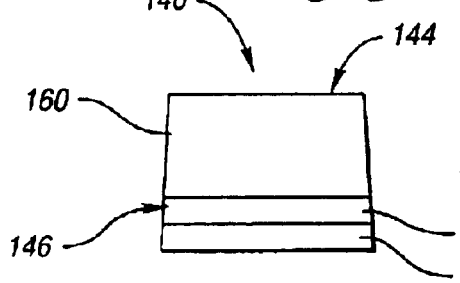
Figure 10B:
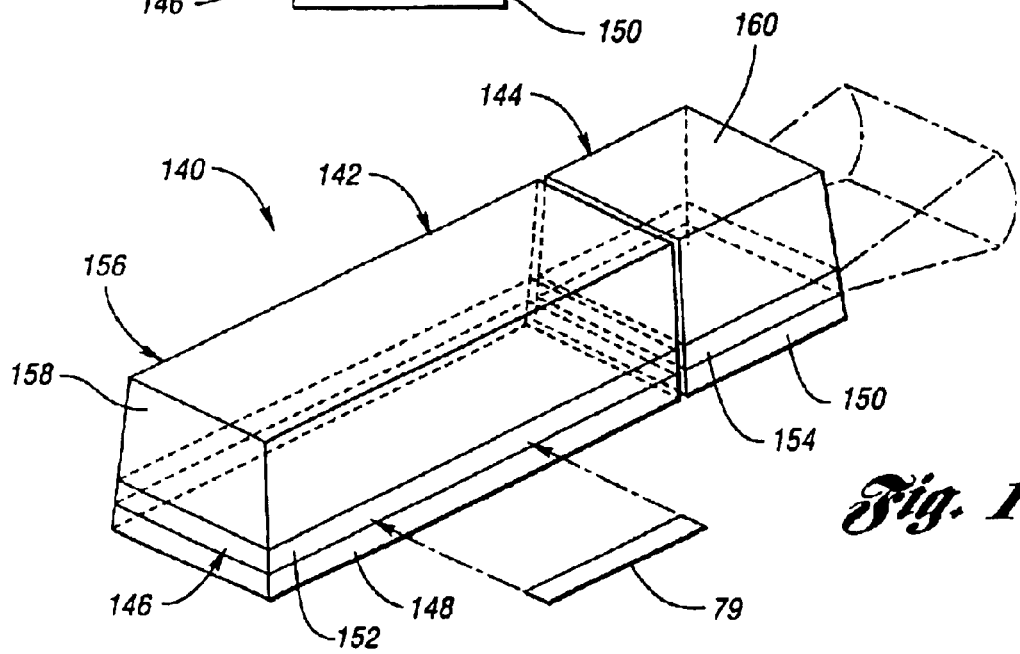
Figure 11A:
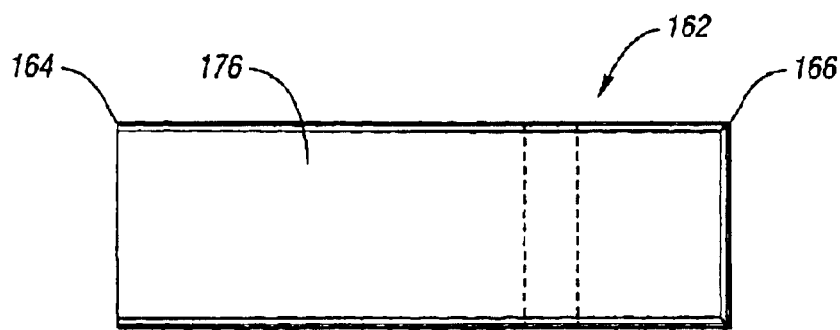
Figure 11B:
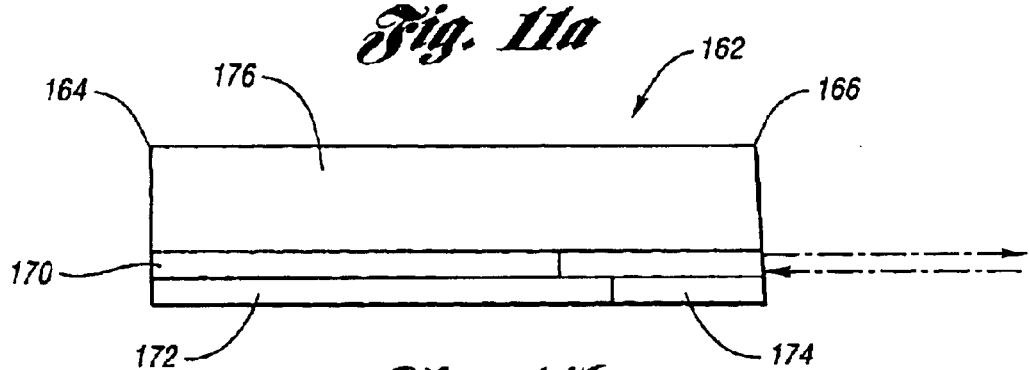
Figure 11C:
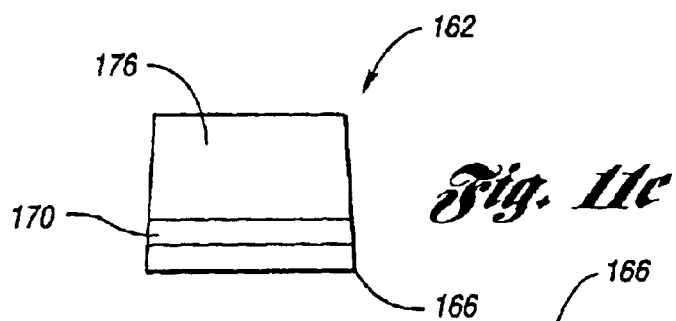
Figure 11B:
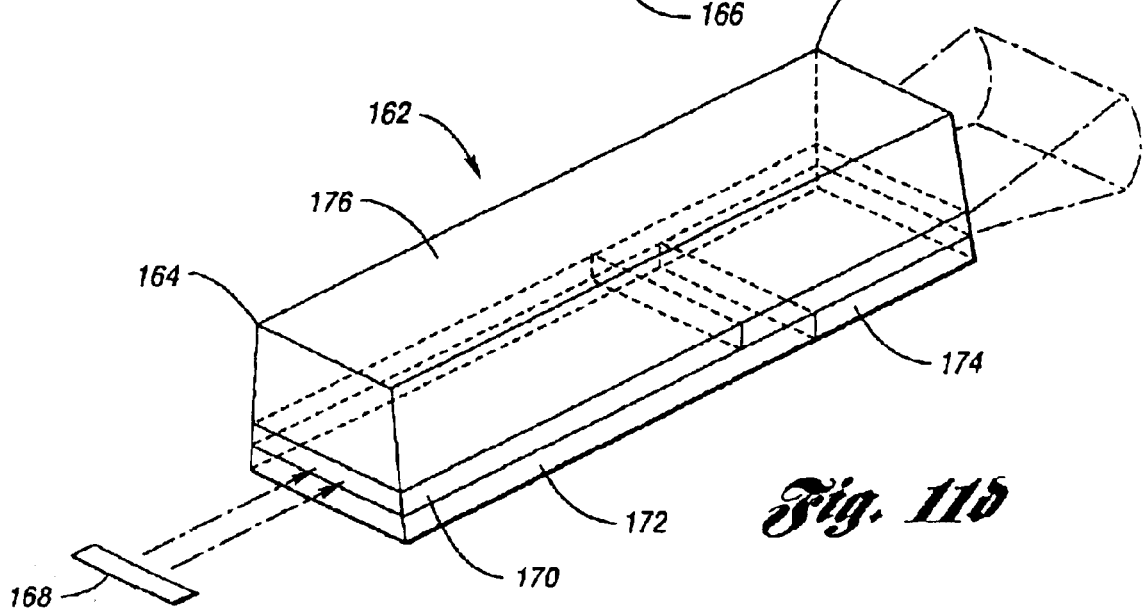
Figure 12A:
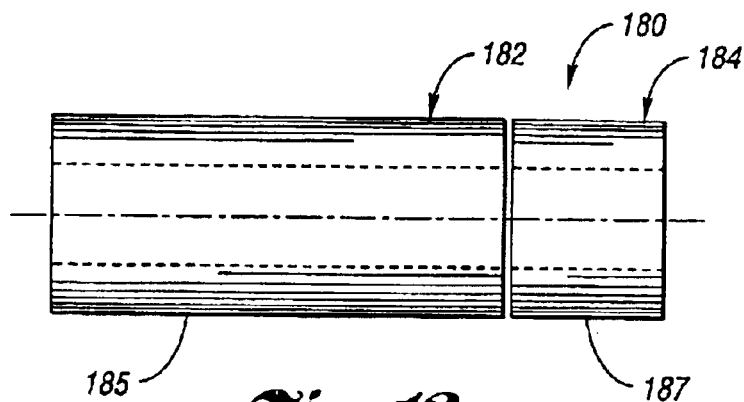
Figure 12B:
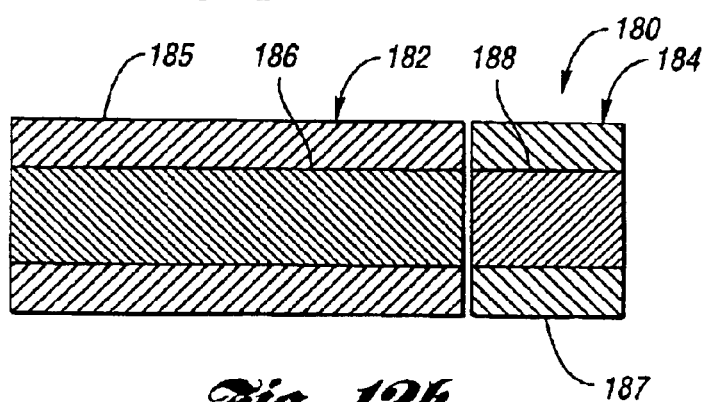
Figure 12C:
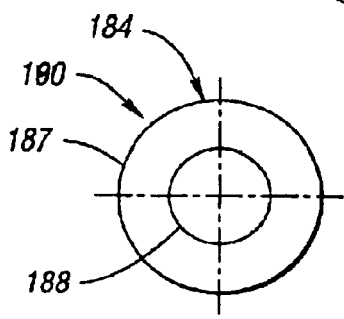
Figure 12B:
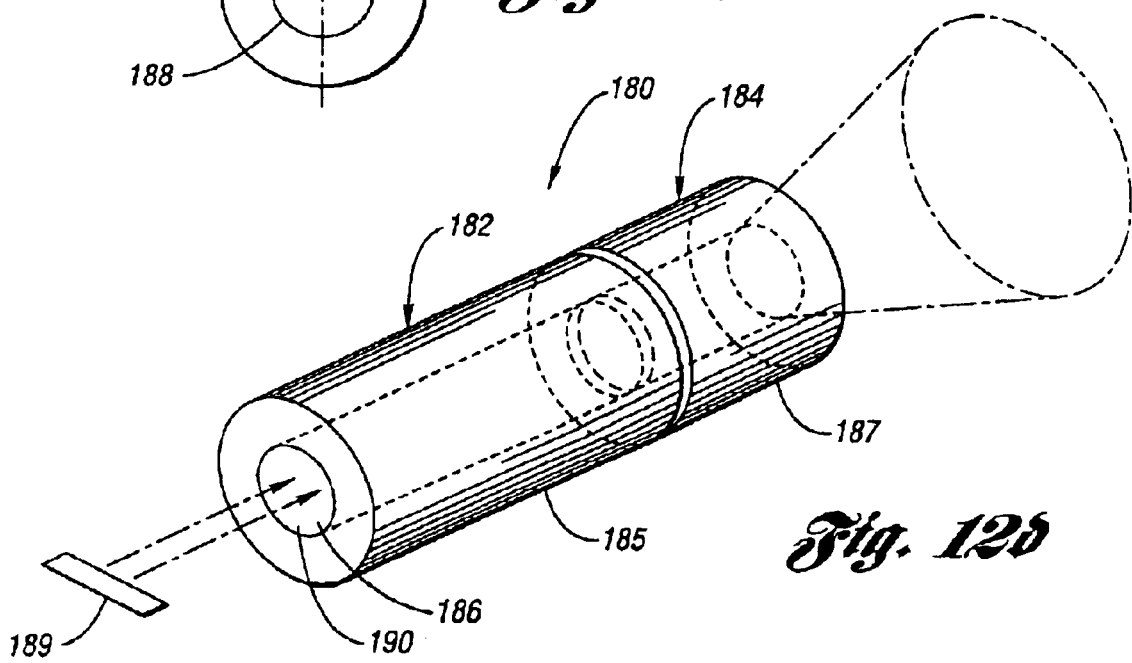

The laser 60 further includes coatings (not shown) at the laser wavelength which are applied to the end faces 74 and 75 as shown in FIG. 6a to form the resonator mirrors. In particular, HR coatings at the laser wavelength are applied to the convex cylindrical surface at the end face 74 and to the concave cylindrical surface at the end face 75.

The outer top/bottom surfaces of the structural member 64, the pump guide cladding 66, and the mode control cladding 70 are fine ground to scatter any light which hits them.

A heatsink (not shown) is bonded to the ground surface of the pump guide cladding 66 to provide cooling.

Side faces 77 of the composite waveguide are polished and AR coated at the pump light wavelength and at the laser wavelength. The side faces 77 are canted to form a trapezoid in a cross-section perpendicular to the optical axis in to order to suppress parasitic oscillations. In the specific case mentioned above, these side faces 77 are each canted by 3 degrees.

The end faces 76 of the composite waveguide are polished and AR coated at the laser wavelength. The end faces 76 may be canted relative to the plane of the core so that reflections off of these faces will not stimulate the backward traveling unstable mode.

Pump diodes 79 are butt-coupled to the sides of the waveguide core 62 along the length of the pump guide cladding 66 but not along the length of the mode control cladding 70.

The embodiment of the invention described above and shown in FIGS. 6a–6d has numerous advantageous features. This embodiment uses bulk sapphire and YAG that are optically contacted to the doped YAG core 62 of the waveguide device to serve as pump light confinement and mode control claddings 66 and 70, respectively. The adhesion of these claddings 66 and 70 to the core 62 can be enhanced by diffusion bonding them to the core 62 and possibly also diffusion bonding them to each other.

This structure has advantages over the prior art in that it provides good pump light confinement and good mode control yet the waveguide is only a three-layer structure and the cladding layers 66 and 70 can be much thicker than in a double-clad structure. Both of these aspects make fabrication much simpler. The only limitation on the thickness of the pump cladding 66 is that the waste heat deposited in the core 62 by the pump light must be removed by conduction through the pump cladding layer 66. For convenience, the mode control cladding 70 would probably be fabricated with the same thickness as the pump cladding 66.

In the pumping section, the sapphire claddings with a refractive index of about 1.75 surround the Nd:YAG core 62 with a refractive index of about 1.82 to define a symmetric waveguide with a NA of about 0.5. This high NA in the pumping section provides excellent capture of the highly divergent fast-axis emission from the pump diodes 79 that are butt-coupled to the sides of the pumping section. The width of the structure is sufficient to guarantee that nearly all of the pump light entering the sides of the pumping section is absorbed in a single pass.

The sides of the structure are anti-reflection (AR) coated at the pump wavelength and at the laser wavelength. The elimination of any optical elements between the pump diodes 79 and the active medium and the nearly complete absorption of the pump light in a single pass make the pumping efficiency of the design very high.

In the mode control section, the waveguide device 60 is asymmetric. The very small refractive index difference ($\Delta n \approx 0.0001$) between the 0.8% doped mode control cladding 70 and the 1.0% doped core 62 defines a very low NA asymmetric waveguide with a NA of about 0.01. This mode control section has an effect similar to placing a mode control aperture into the resonator of a conventional rod-type laser, it blocks the buildup of high order modes. Even though the high NA of the pump section is capable of propagating high order guided modes with low loss, only the lowest order mode can propagate through the mode control section with low loss. The high loss seen by the higher order modes prevents them from building up so only the lowest order mode lases.

Figures 4, 5:
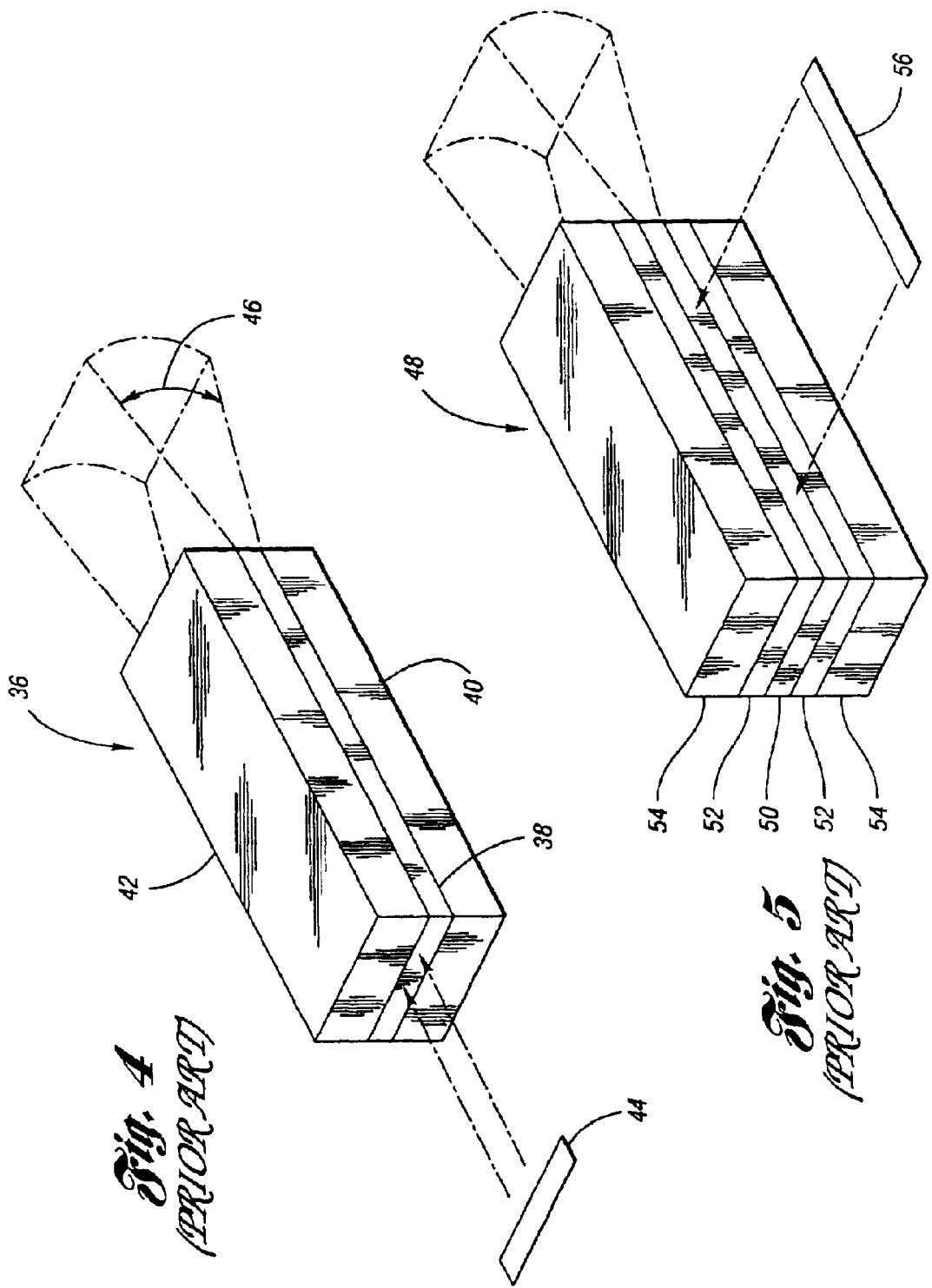
FIG. 4 is a schematic perspective view of a relatively simple, diode-pumped, planar waveguide laser of the prior art.
FIG. 5 is a schematic perspective view of a prior art double-clad, planar waveguide laser.

An advantage of the present invention over the double-clad design of FIG. 5 is that the mode control cladding 70 can be doped with the same ion as the core 62. Since for most solid state gain media there is a very small change in refractive index with doping level, by doping the mode control cladding 70 just slightly differently than the core 62 allows the creation of a very small index difference and thus a very low NA. The very low NA permits the use of a relatively thick core while maintaining single mode operation. The thicker core 62 simplifies fabrication and loosens the alignment tolerances for butt-coupling of the pump diodes 79. Since the dopant in the mode control cladding 70 is the same as that in the core 62, it is possible to control their relative doping level to high accuracy using standard production techniques.

One way to accurately control the relative doping level of the core 62 and the mode control cladding 70 is to take them from different sections of the same boule. There is a small change in the doping level from one end of a boule to the other end resulting from the YAG growth process. If the inner claddings in a double-clad structure were doped with the same ion as the core, a sizable portion of the pump light would be absorbed in the inner claddings and not in the core. This would result in low efficiency for single mode operation. Alternatively, if the inner claddings in a double-clad structure were doped with some other ion in order to decrease the index difference between the inner claddings and the core, it would be very difficult in practice to control the relative refractive indices adequately. Additionally if the doping level in the core of a double clad structure were reduced in order to reduce the index difference between the core and the inner cladding, the rate of pump light absorption in the core would be reduced and a much wider structure would be required in order to achieve the same efficiency. The increased width would make control of the transverse beam quality much more difficult.

In addition to controlling the NA of the laser's output mode, the mode control cladding 70 helps to reduce the buildup of amplified spontaneous emission(ASE) and parasitic lasing modes. Parasitic modes that make reflections on the side faces of the waveguide structure would reduce efficiency and limit gain by extracting some of the absorbed pump power into modes that would not contribute to useful laser output. The sides 77 of the waveguide structure are canted anti-parallel to eliminate parasitic guided lasing modes that might exist if the sides were perpendicular to the core 62. The tilt of the side faces 77 is enough create high losses for such modes by steering light which reflects off of the side faces 77 to angles in the guided direction that are beyond the acceptance angle of the mode control section. The minimum tilt angle of the sides 77 for this purpose is $\Theta_{min} = \sin^{-1}$ (NA of mode control section). This minimum angle is about 1.2° for a mode control NA of 0.02.

The mode control cladding 70 thus helps to greatly reduce the tilt angle required on the sides 77 compared to what would be required in a double-clad structure. To achieve the same parasitic suppression in a double-clad structure, its sides would have to be tilted far enough to steer the beam beyond the acceptance angle of the high NA outer clad to inner clad interface, about 30° for a 0.5NA outer waveguide. Since the large tilt angle required to block parasitic modes in a double-clad structure would present a number of problems, the present invention with its good parasitic suppression is better suited to q-switched operation where high gains are generated while pump energy is stored in the gain medium.

For all modes in waveguides, some portion of the beam energy in each mode propagates in the cladding and not in the core 62. The discontinuous cladding of the present structure may cause some portion of this cladding energy to be clipped or scattered. However, for the relatively thick cores typically used, the percentage of energy in the wings of the lowest order mode is very small and there is a negligible impact on performance due to the discontinuous cladding.

An additional benefit of the preferred embodiment is that the outer surface of the claddings can be diffuse ground to help scatter light that is at high enough angles to pass through the core/mode control cladding interface. This scattering creates a much higher loss for high divergence modes than that which is produced by a double clad structure. In a double clad structure, laser emission modes with divergence angles above the NA of the core/inner clad structure can still be guided with low loss by the high NA of the inner clad/outer clad interface. This means that in the double clad structure there is little difference in propagation loss for low NA modes and high NA modes. Mode control in the double clad laser relies on gain differences between the two sets of modes. The ratio of the gain for the high NA modes relative to the low NA modes in the double clad structure is dependent on the ratio of the core thickness to the total thickness of the core and the inner cladding layers (the core-to-clad ratio).

The preferred embodiment of FIGS. 6a–6d with its much thicker mode control cladding layers 70 which have ground outer surfaces offers higher propagation losses for high NA modes due to the scattering effect of the ground outer surfaces of the mode control cladding 70. It also offers a larger gain difference between low NA modes and high NA modes due to the much smaller core-to-clad ratio. The result of these two effects is that obtaining laser output in only low NA output modes should be much easier than in a double clad structure design.

The scattering effect provided by the ground surface condition on the top and bottom surfaces of the composite waveguide structure also serves to block potential parasitic lasing modes that make reflections on these surfaces. The ground surfaces also help to reduce ASE by scattering spontaneous emission that strikes these surfaces rather than reflecting such light back to the core 62 with low loss as a polished surface might do. To further enhance these effects, the ground surfaces might additionally be coated with a material that is absorbing at the laser wavelength.

In another variation of the embodiment shown in FIGS. 6a–6d, undoped YAG is substituted for Sapphire in both the pump cladding 66 and the structural member 64. Replacing the sapphire components 64 and 66 with undoped YAG components reduces the NA of the pump section but still provides the pumping section with a higher NA (about 0.04) than that of the mode control section (about 0.01). This makes pumping more complex because the diode output must be collimated in order to reduce its divergence to a value that will be guided by the lower NA pumping section.

However, due to the lower NA in the pumping section, this arrangement has reduced levels of ASE and is less likely to suffer from parasitic oscillations. This is advantageous if the device 60 is to be q-switched with large pulse energies or is to be used as a high gain amplifier.

Another embodiment of a planar waveguide laser according to the present invention is generally indicated at 80 in FIGS. 7a–7d. It is similar to the embodiment of FIGS. 6a–6d with the following changes:

The pump guide cladding 66 of FIG. 6 is omitted leaving the pump section of a core 82 unclad on the side opposite a structural member 84. This makes the pump section an asymmetric waveguide with air serving as the cladding on one side of the core 82 and the sapphire of the structural member 84 serving as the cladding on the opposite side of the core 82. Optionally, a coating could be applied to the exposed face 83 of the core 82 in the pump section in order to protect the surface 83 and/or to modify its reflectivity.

Mode control claddings 86 are used on both ends 85 and 87 of the waveguide device 80. The primary reason for adding a second mode control cladding 86 is to facilitate polishing of the ends of the core 82. If an end of the core 82 did not have a cladding 86 on both sides, it might be prone to suffering chips or surface irregularities during the polishing process. In the pump section the core 82 is unclad on one side and must be polished on its sides, but small defects on the sides of the core 82 are not as detrimental to system performance as defects on the ends of the core 82.

A heatsink (not shown) is mounted to the structural member 84 and the structural member 84 has a reduced thickness to reduce the temperature difference between the core 82 and the heatsink during operation.

Ends 85 and 87 of the waveguide are polished flat and AR coated at the laser wavelength. External cylindrical lenses 88 and 90 collimate the beam exiting the ends 85 and 87, respectively, of the waveguide in the guided axis and external cylindrical mirrors 92 and 94 oriented to the transverse direction are used to form the resonator. This resonator configuration is shown with this particular embodiment solely to illustrate an additional resonator option.

Another embodiment of a planar waveguide laser according to the present invention is generally indicated at 100 FIGS. 8a–8d. It is similar to the embodiment of FIGS. 6a–6d with the following changes:

Both the mode control cladding 70 and the pump confinement cladding 66 of FIGS. 6a–6d are omitted. A portion 102 of the length of an exposed face 104 of a core 103 is coated with a coating 105 that reduces the NA of that section of the waveguide device 100 for output mode control. The remainder of the exposed face 104 of the core 103 is unclad to provide a high NA for pump light confinement.

One end 106 of the waveguide is polished flat and AR coated at the laser wavelength. An external cylindrical lens 108 collimates the beam exiting this end 106 of the waveguide device 100 in the guided axis and an external cylindrical mirror 110 oriented to the transverse direction is used to form the resonator on this end. On the opposite end 112 of the waveguide, the end 112 is polished with the required curvature to complete the resonator and is HR coated at the laser wavelength. This resonator configuration is shown with this particular embodiment solely to illustrate an additional resonator option.

An embodiment of a planar waveguide amplifier according to the present invention is generally indicated at 120 in FIGS. 9a–9d. It is similar to the embodiment of FIGS. 6a–6d with the following changes:

A core, generally indicated at 122, is a compound structure made of different materials in different segments 124 and 126 along the length of the waveguide device 120. In at least a portion of the pumping section 124, the core 122 is doped with the desired lasing ion to form the active core section 124. The other section 126 or sections of the core 122 are undoped or doped with a different ion such that absorption of pump light in these other sections is reduced or eliminated to form the passive core section 126. The compound core 122 may be fabricated by diffusion bonding the different materials together prior to fabricating the waveguide. The transition(s) between the different segments 124 and 126 of the core 122 preferably does not coincide with a transition between different cladding sections (i.e. pump cladding 128 and mode control cladding 130).

Ends 132 and 134 of the waveguide device 120 including a substrate 135 are polished flat, anti-reflection coated at the laser wavelength, and tilted so that the device 120 forms a trapezoid when viewed from the side (i.e. FIG. 9b). The tilt of the faces at the ends 132 and 134 helps to minimize ASE, block parasitic oscillations, and minimize the amount of light reflected back toward the source of the laser beam to be amplified.

The beam to be amplified is focused into the end 132 of the waveguide. It is amplified as it passes through the waveguide and it is emitted from the opposite end 134 of the waveguide.

Another embodiment for a planar waveguide amplifier according to the present invention is generally indicated at 140 in FIGS. 10a–10d and includes a pump section, generally indicated at 142, and a separate mode control section, generally indicated at 144. It is similar to the embodiment of FIGS. 9a–9d with the following changes:

At the transition from the pump section 142 to the mode control section 144, a core, generally indicated at 146, and pump and mode control claddings 148 and 150, respectively, are discontinuous so that the pump section 142 and the mode control section 144 are formed by separate waveguide elements. The core 146 includes first core member 152 and a second core member 154. A substrate/structural layer, generally indicated at 156, includes a first structural member 158 and a second structural member 160. To make these separate elements function together in a manner similar to the other embodiments, the output from the core member 152 on one end of the pump section 142 is coupled into the core member 154 on one end of the mode control section 144 via optical contacting, butt coupling, or a relay imaging system.

In the mode control section 144, the structural member 160 might be made of the same material as the mode control cladding 150 so that the mode control section 144 forms a symmetrical waveguide. The core member 154 in the mode control section 144 might be a different material than the core member 152 of the pump section 142.

Another embodiment for a planar waveguide amplifier according to the present invention is generally indicated at 162 in FIGS. 11a–11d. It is similar to the embodiment of FIGS. 6a–6d with the following changes:

A pumping section end 164 of the waveguide device 162 is polished flat, perpendicular to the optical axis and is coated with a coating that has high reflectivity at the laser wavelength and low reflectivity at the pump wavelength.

A mode control end 166 of the waveguide device 162 is polished flat, anti-reflection coated at the laser wavelength, and tilted slightly relative to the guided direction.

The waveguide device 162 is end-pumped rather than side-pumped by coupling light from pump diodes 168 into the end 164 of the pumping section. In this case, the anti-reflection coatings at the pump wavelength on the sides of the device 162 may be omitted. Anti-reflection coatings at the laser wavelength may be added to the sides of the device 162 to help minimize ASE.

The beam to be amplified is focused into the mode control end 166 of the waveguide device 162, as illustrated in FIG. 1*b*. It is amplified as it passes through the waveguide device 162 to the pumping end 164, is reflected, and passes back through the waveguide device 162 to the mode control end 166 where it is emitted from the waveguide device 162.

The waveguide amplifier device 162 further includes a core 170 having active and passive core members, a pump cladding 172, a mode control cladding 174 and a substrate/structural member 176 as before.

Another embodiment of the present invention is generally indicated at 180 in FIGS. 12*a*–12*d*. In this embodiment, the waveguide device 180 is configured as a fiber and has a pumping section, generally indicated at 182, and mode control section, generally indicated at 184, which are different types of fiber and they are preferably fusion spliced together. A fiber used in the pumping section 182 has a core member 186 doped with the active laser ion and a relatively high NA, preferably 0.22 or greater and a pump cladding 185. A fiber used in the mode control section 184 has a core member 188 which may or may not be doped with the active laser ion and has a low NA, preferably less than 0.1. The fiber of the mode control section 184 has a mode control cladding 187. Pump light from a pump laser diode 189 is coupled into a free end 190 of the pumping section 182. The low NA of the mode control section 184 permits a fiber laser or amplifier using this invention to maintain single mode output while using multimode fiber in the pumping section 182. The larger core size offers single include output at higher power without the damage problems or nonlinear effects that might occur in a smaller core fiber at the same power level. Some care must be taken with the mounting and routing of the fiber in the pumping section 132 to avoid inducing stresses that might cause some of the propagating energy to couple into higher order modes which would be stripped by the mode control section 184.

While the best mode for carrying out the invention has been described in detail, those familiar with the art to which this invention relates will recognize various alternative designs and embodiments for practicing the invention as defined by the following claims.

What is claimed is:

1. A waveguide device having a plurality of sections arranged in series which acts as a planar waveguide in at least one direction of the device, the device comprising:
   a non-circular core including a pumping section and having a pump input surface for receiving pumping radiation at a pumping wavelength and at least one output surface for emitting a laser beam at an output wavelength; and
   means for providing pump-light confinement and means for providing output mode control in different ones of the sections of the device along the direction of beam propagation.

2. The device as claimed in claim 1 wherein the core is a single member.

3. The device as claimed in claim 1 wherein the core includes an active core member doped with a lasing ion and an undoped passive core member.

4. The device as claimed in claim 1 wherein the means for providing pump-light confinement includes a pump-light containment component having a refractive index different from the core in contact with a surface of the core in the pumping section of the device.

5. The device as claimed in claim 4 wherein the means for providing the pump-light containment is a pump cladding having a refractive index different from the core.

6. The device as claimed in claim 5 wherein the means for providing output mode control includes a mode control cladding in contact with the core.

7. The device as claimed in claim 6 wherein the mode control cladding includes a material having a refractive index between that of the core and that of the pump cladding.

8. The device as claimed in claim 7 wherein the mode control cladding is doped or undoped YAG.

9. The device as claimed in claim 5 wherein the pump cladding has a lower refractive index than the refractive index of the core.

10. The device as claimed in claim 9 wherein the pump cladding is sapphire or undoped YAG.

11. The device as claimed in claim 1 wherein the means for providing output mode control includes a coating in contact with the core.

12. The device as claimed in claim 1 wherein the means for providing output mode control includes a grating in contact with the core.

13. The device as claimed in claim 1 wherein the core is a planar core.

14. The device as claimed in claim 13 wherein the planar core includes doped YAG.

15. The device as claimed in claim 13 wherein the planar core includes a first core member which absorbs the pumping radiation, and a separate second core member and the second core member either does not absorb the pumping radiation or has an absorption lower than the absorption of the first core member at the pumping wavelength.

16. The device as claimed in claim 13 wherein the device is formed as a pair of separate waveguides which are butt-coupled or coupled together by an imaging system.

17. The device as claimed in claim 1 further comprising a substrate for supporting the core.

18. The device as claimed in claim 1 wherein the device is a planar waveguide laser.

19. The device as claimed in claim 1 wherein the core has laser input surface for receiving a source laser beam to be amplified and wherein the device is a optical amplifier.

20. The device as claimed in claim 19 wherein the core is planar and wherein the optical amplifier is a planar waveguide amplifier.

21. The device as claimed in claim 19, wherein the laser input surface is a different surface from either the pumping input surface or the at least one output surface.

22. The device as claimed in claim 19 wherein the laser input surface is the same as the at least one output surface.

23. The device as claimed in claim 1 wherein the means for providing output mode control of the device has a lower NA than the pumping section of the device.

24. The device as claimed in claim 23 wherein the pumping section has a NA greater than 0.05.

25. The device as claimed in claim 23 wherein the output mode control section has a NA less than 0.22.

26. The device as claimed in claim 1 wherein the non-circular core has a thickness in the range of about 5–200 microns, a width of about 0.5–10 mm, and a length of about 10–150 mm.

27. The device as claimed in claim 1 wherein the waveguide is a three layer structure.

28. The device as claimed in claim 1 wherein the means for providing pump light confinement includes a pump cladding, the means for providing output mode control includes a mode control cladding different from the pump cladding, and wherein the mode control cladding and the pump cladding have approximately the same thickness.

29. A method for generating a laser beam having a desired output mode, the method comprising:

provjding a non-circular core having a pump input surface and at least one output surface, the core serving as a planar waveguide in at least one direction;

pumping the core at the pump input surface with pumping radiation at a pumping wavelength so that an output laser beam is emitted at the at least one output surface at an output wavelength; and separating the functions of pump-light confinement and output mode control using different sections arranged in series along the length of the waveguide.

30. The method as claimed in claim 29 wherein the method further comprises;

transmitting a source laser beam into the core at a laser input surface of the core wherein the source laser beam is amplified within the core and wherein the output beam is an amplified source laser beam.

* * * * *